(12) United States Patent
Mathew

(10) Patent No.: US 9,007,303 B2
(45) Date of Patent: Apr. 14, 2015

(54) IDENTIFICTION CARD HAVING A PLURALITY OF IMAGES

(71) Applicant: Bejoy Mathew, Dardenne Prairie, MO (US)

(72) Inventor: Bejoy Mathew, Dardenne Prairie, MO (US)

(73) Assignee: MasterCard International Incorporated, Purchase, NY (US)

( * ) Notice: Subject to any disclaimer, the term of this patent is extended or adjusted under 35 U.S.C. 154(b) by 74 days.

(21) Appl. No.: 13/857,406

(22) Filed: Apr. 5, 2013

(65) Prior Publication Data
US 2014/0300556 A1 Oct. 9, 2014

(51) Int. Cl.
*G09G 5/00* (2006.01)
*G06F 3/041* (2006.01)
*G06F 3/03* (2006.01)

(52) U.S. Cl.
CPC *G09G 5/006* (2013.01); *G06F 3/03* (2013.01); *G06F 3/041* (2013.01)

(58) Field of Classification Search
CPC ......... G06F 15/16; G06F 19/00; G07F 19/00; G06K 19/07707; G06K 19/06; G06K 5/00; G06Q 40/00
See application file for complete search history.

(56) References Cited

U.S. PATENT DOCUMENTS

| | | | |
|---|---|---|---|
| 7,913,918 B2* | 3/2011 | Zellner et al. | 235/492 |
| 8,393,546 B1* | 3/2013 | Yen et al. | 235/487 |
| 2011/0138334 A1* | 6/2011 | Jung | 715/841 |
| 2011/0147461 A1* | 6/2011 | Chen | 235/488 |
| 2011/0254877 A1* | 10/2011 | Mowry et al. | 345/690 |
| 2012/0303484 A1* | 11/2012 | Kim et al. | 705/26.61 |

* cited by examiner

*Primary Examiner* — Andrew Sasinowski
(74) *Attorney, Agent, or Firm* — Buckley, Maschoff & Talwalkar LLC

(57) ABSTRACT

According to some embodiments, an identification card may be provided with a processor, coupled to a substantially card-shaped body, executing an operating system. A substantially planar display device may also be coupled to the card-shaped body and communicate with the processor to provide visual information to a cardholder. A storage unit, coupled to the card-shaped body and in communication with the processor, may store a plurality of image files. According to some embodiments, execution of the operating system results in a selection of one of the image files to be provided on the display device.

20 Claims, 15 Drawing Sheets

| IMAGE IDENTIFIER 302 | IMAGE FILE 304 | IMAGE RULE 306 |
|---|---|---|
| I_1001 | DOG.JPG | DEFAULT |
| I_1002 | FLOWERS.BMP | BUTTON SELECTION |
| I_1003 | FLAG.JPG | TODAY'S DATE = JULY 4 |
| I_1004 | HOLIDAY.PNG | (TODAY'S DATE ≥ DEC. 1) AND (TODAY'S DATE ≤ JAN. 1) |

FIG. 3

IDENTIFICTION CARD HAVING A PLURALITY OF IMAGES

BACKGROUND

A cardholder may enjoy customizing her or her identification card. For example, a cardholder might like to have an image or logo associated with his or her favorite baseball team printed on his or her credit card. In some cases, a cardholder may be allowed to upload an image, such as a picture of his or her pet, to be printed on an identification card. Such an approach, however, has limitations. For example, a cardholder might have a number of different images that he or she would like to see on the identification card. For example, a cardholder might prefer that a baseball logo be displayed during baseball season and a football logo be displayed during football season. As a result, improved systems and methods of providing identification card customization may be desired.

BRIEF DESCRIPTION OF THE DRAWINGS

FIG. 3 is a portion of a tabular image database that might be provide according to some embodiments.

DETAILED DESCRIPTION

Figure 1A:
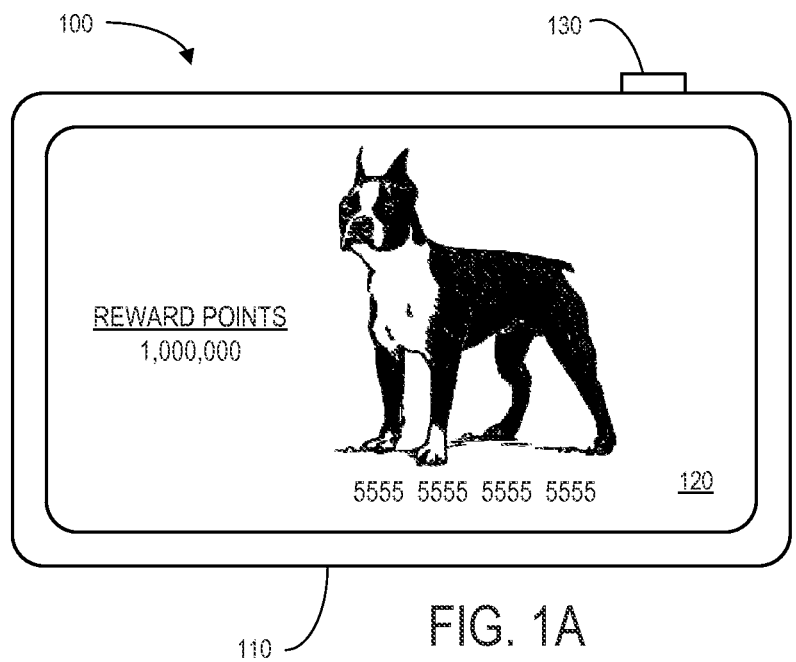
FIGS. 1A and 1B are top views of an identification card according to some embodiments of the present invention.

In general, and for the purpose of introducing concepts of embodiments of the present invention, an "identification card" may be provided with a plurality of customizable images. As used herein, the phrase "identification card" might refer to, for example, a payment card, a credit card, a debit card, a loyalty program card, a badge, a license, a passport card, a radio frequency apparatus, and/or a contactless card. By way of example, FIG. 1A is a top view of an identification card face 100 having a substantially planar display device 120 affixed to a card-shaped body 110 according to some embodiments of the present invention. In particular, illustrated is a substantially card-shaped body 110 that might comprise an International Standards Organization/International Electrotechnical Commission ("ISO/IEC") 7810 ID-1 sized card having a thickness of 0.76 mm (0.030 in) and a top area of 85.60×53.98 mm (3.370×2.125 in) with rounded corners having a radius of 2.88-3.48 mm.

Note that the display device 120 might be formed integral with the card body 110. Moreover, the card body 110 and/or display device 120 may be formed of glass, plastic, metal, rubber, and/or be coated with another material (e.g., a textured substance that improves a user's ability to grip the card body 110). The display device 120 may comprise, for example, a digital display including Light Emitting Diodes ("LEDs") abd.ir other display elements. According to other embodiments, the display device 120 is not integral with the card body 110 but instead is affixed to the card body 110 (e.g., via an adhesive). Note that the card body 110 and display device 120 might be formed of different materials. Further note that any of the embodiments described herein might be formed of a non-natural alloy of aluminum, silver and other metals with appropriate properties, such as strength, luminosity, and/or flexibility. Moreover, the embodiments may be formed using secondary materials such as hard woods, polymers, glasses, rubbers, jewels, fabrics, rocks, gemstones, and other naturally occurring materials individually or in combined non-natural states. According to some embodiments, the display device 120 is flexible enough to comply with the ISO 7816 standard.

According to some embodiments, the identification card 100 further includes a processor, coupled to the card-shaped body 110, executing an operating system. The display device 120 may be coupled to the card-shaped body and in communication with the processor to provide visual information to a cardholder. The identification card 100 may further include a storage unit such as a memory device, coupled to the card-shaped body and in communication with the processor, to store a plurality of image files. Moreover execution of the operating system by the processor may result in selection of one of the plurality of image files to be provided on the display device 120.

Figure 1B:
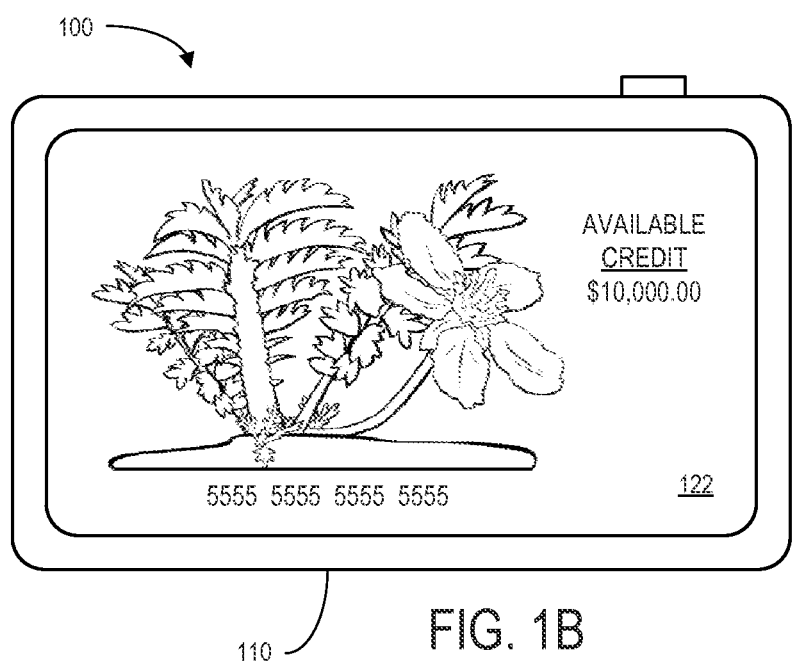

By way of example, the display device 120 in FIG. 1A is displaying an image of a dog along with an amount of reward points that may be associated with a cardholder. FIG. 1B also illustrates the identification card 100. In this case, however, the display device 122 is displaying an image of flowers along with an amount of available credit that may be associated with the card holder. According to some embodiments, an input device 130 may be used to toggle between the two displays 120, 122. According to some embodiments, an image may be automatically selected for display based on, for example, a season of year, a day of year (e.g., a picture of a birthday cake might be displayed on the cardholder's birthday), a day of week (e.g., a different image might be displayed on the weekend), and/or a time of day.

According to another embodiment, the selection of an image may be based at least in part on location information. For example, the identification card 100 may further include a wireless communication device coupled to the card-shaped body 110 and in communication with the processor, and the selection may be based at least in part on information received via the communication device. For example, when a cardholder visits a baseball stadium, a logo associated with that particular baseball team might be provided on the display device 120. Note that one or more image files might be received by such a wireless communication device. In addition to images (including, for example, photographs, animations, and moving images), the information received via the wireless communication device may be used to provide, on the display device, at least one of: (i) a rewards program point value, (ii) an amount of available credit, (iii) transaction information, (iv) location information, (v) a security token, (vi) advertising information, (vii) coupon information, (viii) warranty information, (ix) insurance information, and/or (x) a commercial offer.

The input device 130 of the identification card 100 might comprise, for example, a switch. Other examples of input devices include a touch screen incorporated into the display device 120 (e.g., the cardholder might swipe the display device 120 with his or her finger to see a new image), a microphone (e.g., voice commands might be used to change the displayed image), and/or a wireless communication device.

Figure 2:
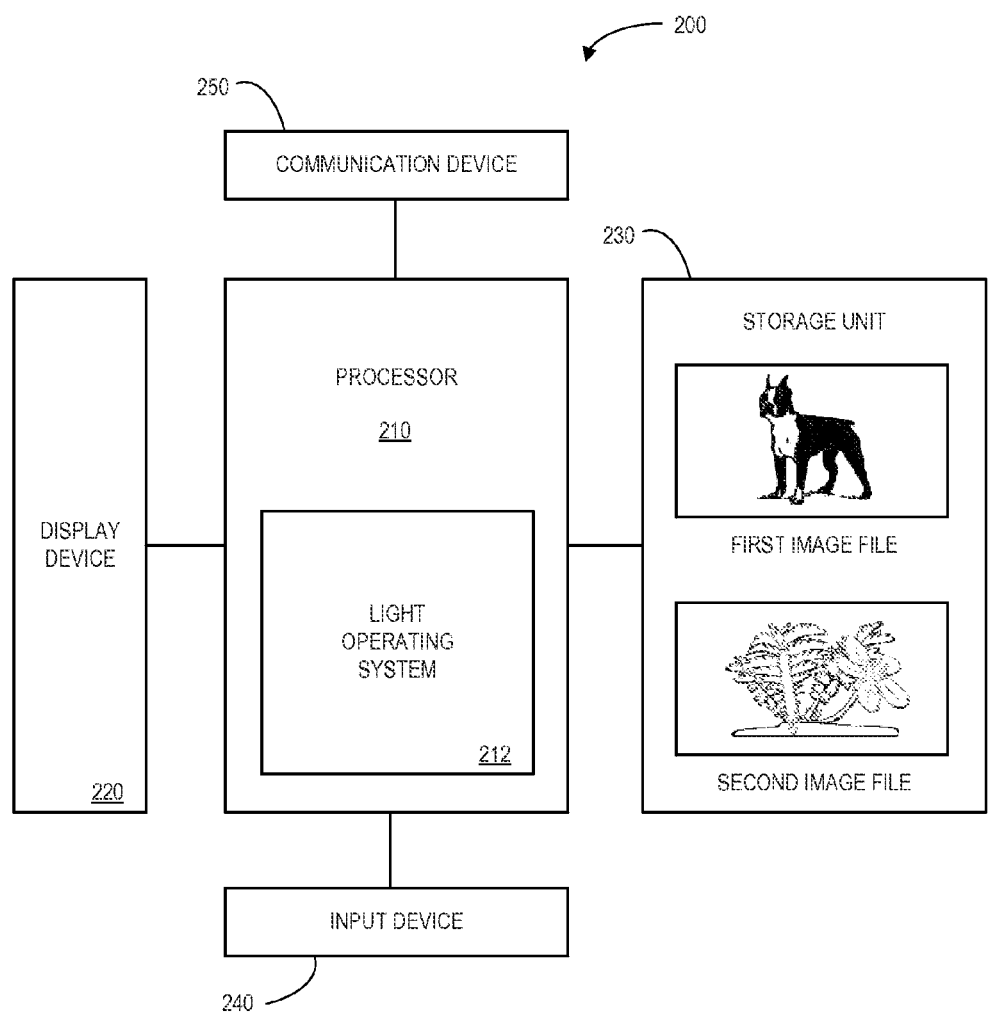
FIG. 2 is a block diagram view of a system that may be incorporated within an identification card in accordance with some embodiments.

The embodiments described herein may be implemented using any number of different hardware configurations. For example, FIG. 2 illustrates an identification card 200 that may be, for example, associated with the one described in connection with FIGS. 1A and 1B. The identification card 200 comprises a processor 210, such as one or more commercially available Central Processing Units (CPUs) in the form of one-chip microprocessors, coupled to a communication device 520 configured to communicate via a communication network (not shown in FIG. 2). The communication device 250 may be used to communicate, for example, with one or more remote devices. The identification card 200 further includes an input device 240 (e.g., a touch screen) and display device 220.

The processor 210 also communicates with a storage unit 230. The storage unit 230 may comprise any appropriate information storage unit, including combinations of magnetic storage units (e.g., a hard disk drive), optical storage units, and/or semiconductor memory devices. The storage unit 230 stores a program and/or instructions associated with light operating system 212 and/or image selection engine for controlling the processor 210. Note that according to some embodiments, the light operating system 212 may be similar to those used in smaller handheld devices, such as GPS devices (as opposed to more complex operating systems). The processor 210 performs instructions of the programs, and thereby operates in accordance with any of the embodiments described herein. For example, the processor 210 may retrieve a first image file from the storage unit 230. The processor 210 may then arrange to provide the first image file via the substantially planar display device 220 coupled to a card-shaped body of the identification card. The processor 210 may further detect a trigger event (e.g., via the input device 240 or communication device 250), retrieve a second image file from the storage unit 230, and arrange to provide the second image file via the display device 220.

Note that the images stored in the storage unit 230 might, according to some embodiments, be pre-loaded onto the identification card by a manufacturer (e.g., after being selected by a cardholder via a web site). According to other embodiments, the images might be received wirelessly via the communication device 250 (e.g., from a cloud-based server). According to some embodiments, some or all of the images may be stored in an identification card case or a sticker to be attached to an identification card.

The programs described herein may be stored in a compressed, uncompiled and/or encrypted format. The programs may furthermore include other program elements, such as an operating system, a database management system, and/or device drivers used by the processor 210 to interface with peripheral devices. The storage unit 230 may include different types of memory, such as volatile and non-volatile memory and read-only and programmable memory. The storage unit 230 can store transaction card data such as, for example, a user's Primary Account Number ("PAN"). The storage unit 230 can store the light operating system 212 of the transaction card 100. The operating system 212 may load and execute applications and provide file management or other basic card services to the applications. In some embodiments, one or more applications may "sit" directly on hardware, that is, may be outside the domain of the operating system 212. One operating system 212 that can be used to implement the invention is the MULTOS™ operating system licensed by StepNexus Inc. Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system 212 is stored in read-only memory ("ROM") within storage unit 230. In an alternate embodiment, flash memory or other non-volatile and/or volatile types of memory may also be used in the storage unit 230. In addition to the basic services provided by the operating system, the storage unit 230 may also include one or more applications as described herein. At present, one preferred standard to which such applications may conform is the EMV payment standard set forth by EMVCo, LLC.

As used herein, information may be "received" by or "transmitted" to, for example: (i) the identification card 200 from another device; or (ii) a software application or module within the identification card 200 from another software application, module, or any other source.

In some embodiments, the storage unit 230 further stores an image database 300. An example of a database that may be used in connection with the identification card 200 will now be described in detail with respect to FIG. 3. Note that the database described herein is only one example, and additional and/or different information may be stored therein. Moreover, various databases might be split or combined in accordance with any of the embodiments described herein.

Referring to FIG. 3, a table is shown that represents the image database 300 that may be stored at the identification card 200 according to some embodiments. The table may include, for example, entries identifying images that may be displayed on an identification card. The table may also define fields 302, 304, 306 for each of the entries. The fields 302, 304, 306, 308, 310, 312 may, according to some embodiments, specify: an image identifier 302, an image file 304, and an image rule. The image database 300 may be created and updated, for example, based on information received from a cardholder or remote server.

The image identifier 302 may be, for example, a unique alphanumeric code identifying a particular image. The image file 304 may contain the image or a pointer to where the image is stored. The image rule 306 may define, for example, one or more logical operations or rules, trigger events, etc. that define when the image should be provided on the display device of the identification card. For example, as illustrated in FIG. 3 the picture named "FLAG.JPG" will be displayed on the display device of an identification card when the current date equals July 4.

Figure 4:
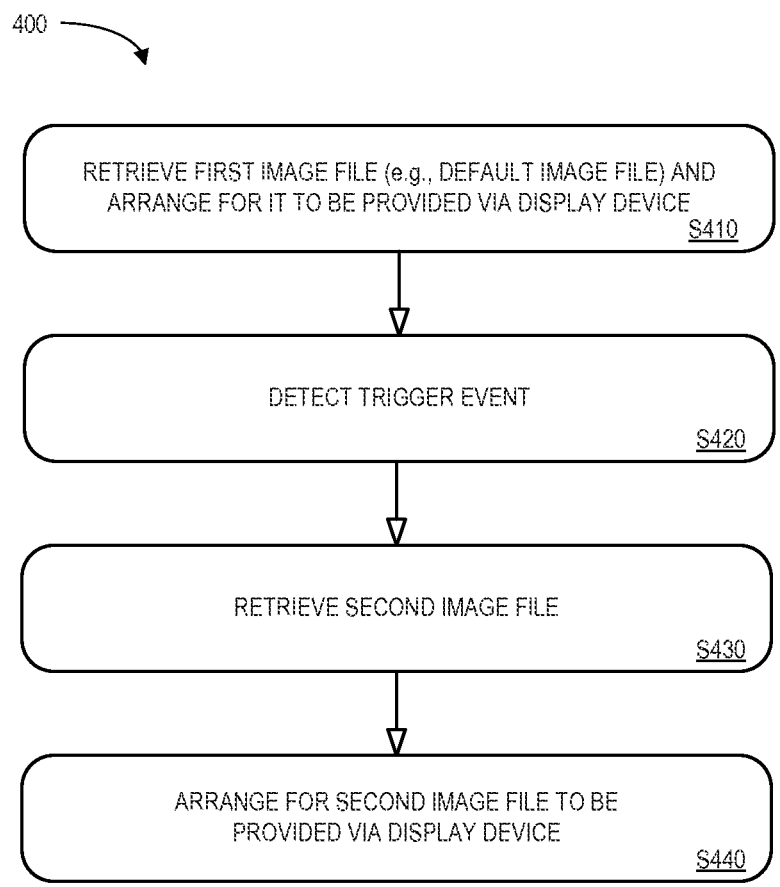
FIG. 4 is an example of an identification card method that may be provided in accordance with some embodiments.

FIG. 4 illustrates a method 400 that might be performed by some or all of the elements of the identification card 100, 200 described with respect to FIGS. 1A, 1B, and 2 according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S410, a first image file (e.g., a default image file) may be retrieved from a storage unit and it may be arrange to provide the first image file via a substantially planar display device coupled to a card-shaped body of an identification card. For example, a processor might retrieve a default image file from the storage unit and display the default image to the cardholder.

At S420, a trigger event may be detected. The trigger event might be detected via at least one of a touch screen incorporated into the display device, a switch, a clock, a microphone, and/or a wireless communication device. In response to detection of the trigger event a second image file is retrieved from the storage unit at S430. The second image may then be provided to the cardholder via the display device at S440. For example, the wireless communication device might provide information that the identification card is currently located with a particular retailer's store. Response to this trigger event, business logic might cause the processor to retrieve a coupon image and display that image to the cardholder. According to some embodiments, a cardholder might need to register with an image service or otherwise obtain access to the second image file.

Figure 5:
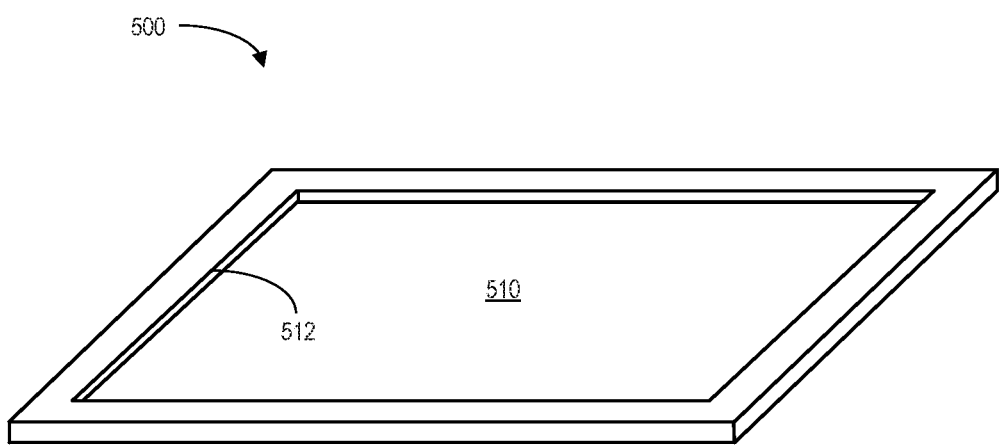
FIG. 5 is a perspective view of an identification card having a recessed display device portion according to some embodiments of the present invention.
Figure 6:
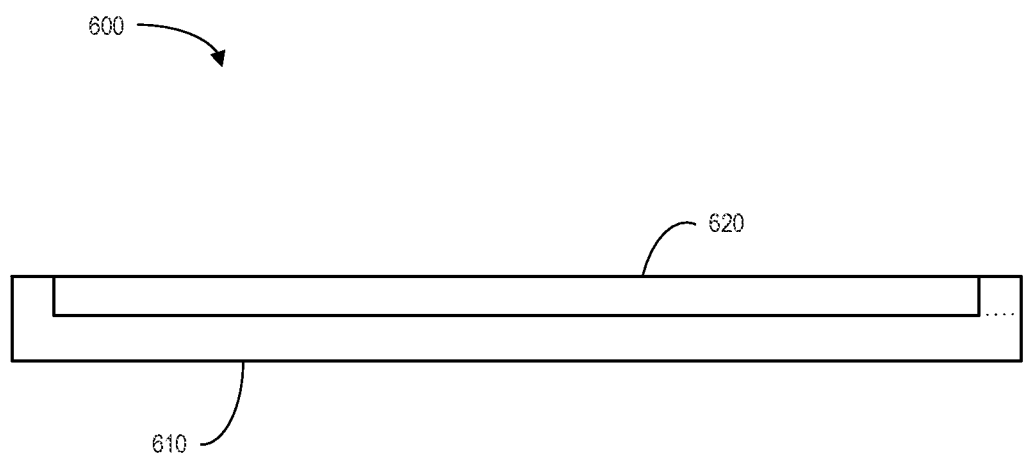
FIG. 6 is a side cross-sectional view of an identification card according to some embodiments of the present invention.

FIG. 5 is a perspective view of an identification card 500 having a recessed display device portion 512 formed within the card-shaped body 510 according to some embodiments of the present invention. The recessed display device portion 510 may be shaped to match the shape of a display device and/or other elements of a transaction card system (e.g., processor, storage unit, etc.). FIG. 6 is a side cross-sectional view of an identification card 600 according to some embodiments of the present invention. In this example, a display device 620 sits within a recessed portion of the card-shaped body 610 of the transaction card 600.

Figure 7:
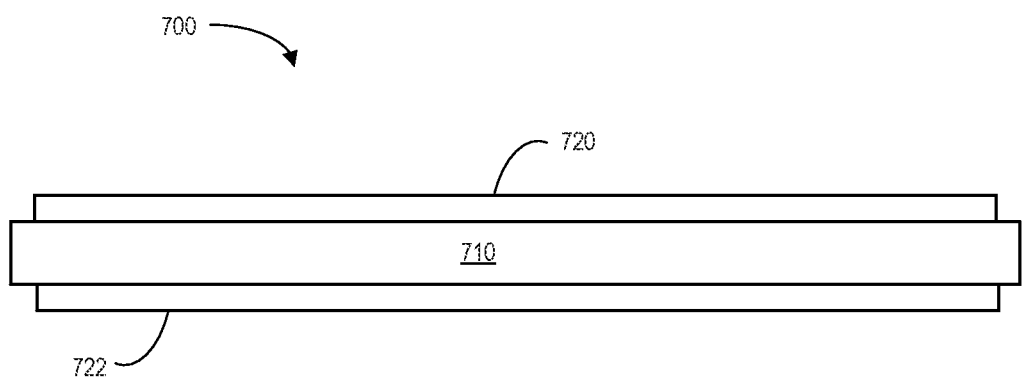
FIG. 7 is a side cross-sectional view of an identification card according to another embodiment of the present invention.

According to other embodiments, no such recessed portion may be provided. For example, FIG. 7 is a side cross-sectional view of an identification 700 card according to another embodiment of the present invention. In this case, a display device 720 and/or other elements of a transaction card system sits on top of the front face of the card-shaped body 710 of the transaction card. Moreover, according to this embodiment, a second display device 722 and/or other elements of a transaction card system sits on top of the back face of the card-shaped body 710.

Figure 8:
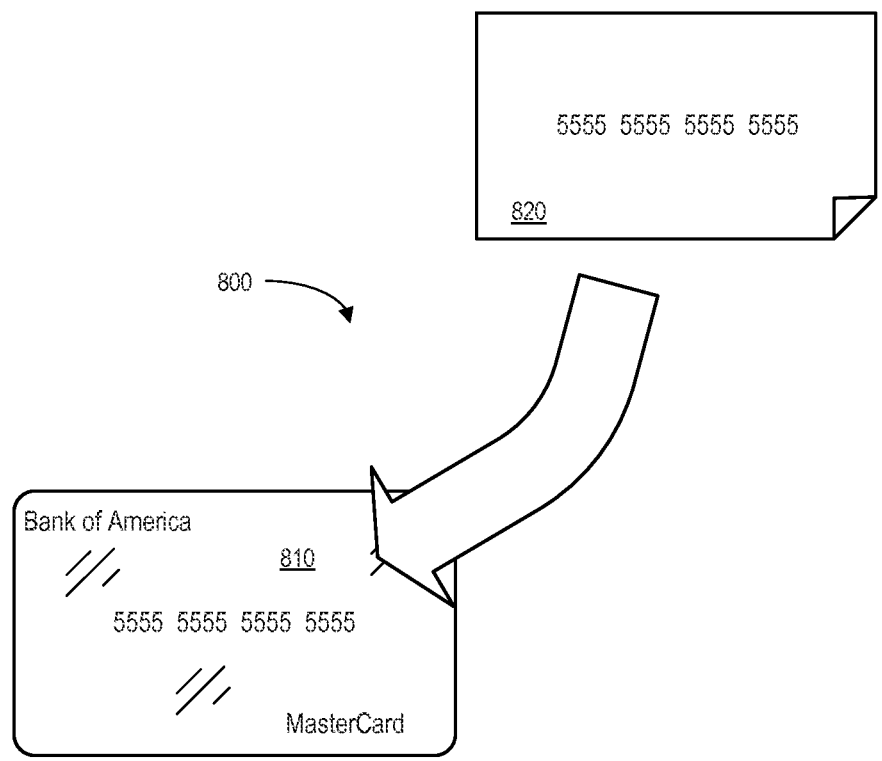
FIG. 8 is one example of how an identification card might be provided in accordance with some embodiments.

According to some embodiments, a transaction card may be provided to a cardholder with a display device, etc. already incorporated into the card. In other cases, the display device etc. may instead be provided to a cardholder who already owns a transaction card. For example, FIG. 8 is one example 800 of how an identification card 810 might be provided in accordance with some embodiments. In this case, a separate display device 820 may be provided to a cardholder. The display device 820 might comprise, for example, a flexible display that can be attached to the card-shaped body 810 via an adhesive. For example, a cardholder might apply a sticker-like display device 820 to the transaction card 810.

Figure 9:
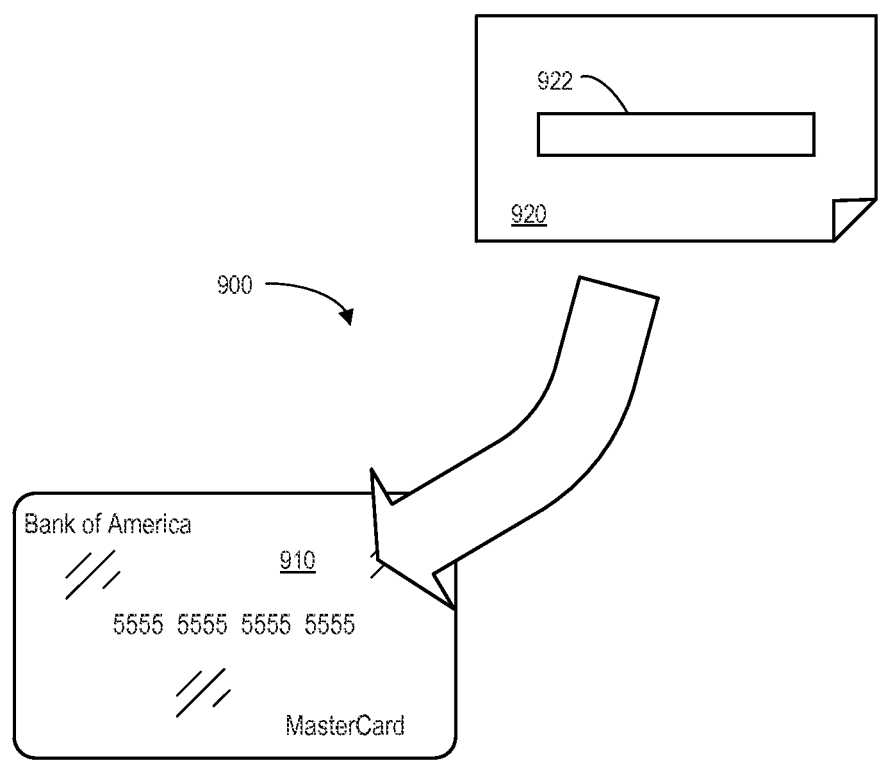
FIG. 9 is another example of how an identification card might be provided in accordance with some embodiments.

Note that some transaction cards have embossed numbers, magnetic strips, signature blocks, and/or other printed information that should not be obscured. In such cases, FIG. 9 is another example 900 of how an identification card 910 might be provided to a cardholder who already owns a transaction card in accordance with some embodiments. As before, a separate display device 920 may be provided to a cardholder. The display device 920 might comprise, for example, a flexible display that can be attached to the card-shaped body 910 via an adhesive. For example, a cardholder might apply a sticker-like display device 920 to the transaction card 910. In this embodiment, the display device 920 further includes an open portion 922 designed to permit access to a portion of the card-shaped body (e.g., in the example of FIG. 9, the open portion 922 may allow access to an embossed credit or debit card number).

Figure 10:
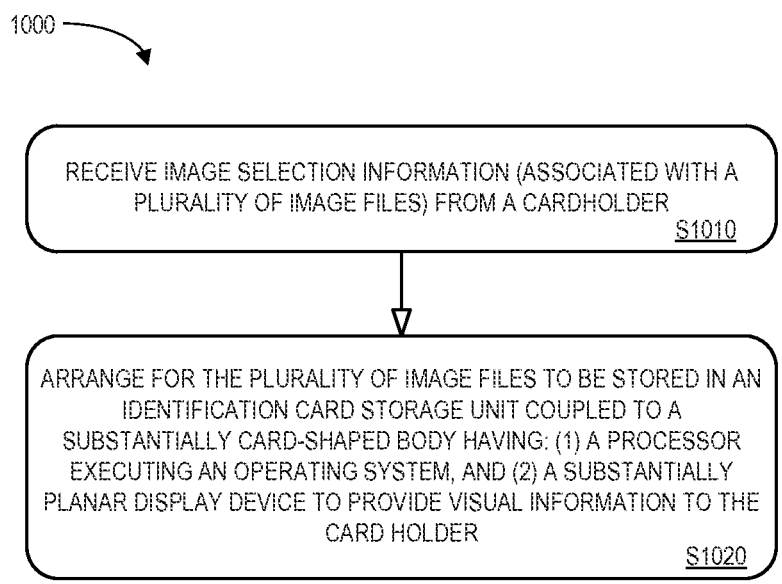
FIG. 10 is an identification card customization method that may be performed in accordance with some embodiments.

Thus, some embodiments may let a transaction card display multiple images to a card holder. Note that a cardholder might select and/or configure such images in a number of different ways. For example, FIG. 10 is an identification card customization method 1000 that may be performed in accordance with some embodiments. At S1010, image selection information, associated with a plurality of image files, is received from a cardholder. It may then be arranged for the plurality of image files to be stored in an identification card storage unit coupled to a substantially card-shaped body having: (1) a processor executing an operating system, and (2) a substantially planar display device to provide visual information to the card holder. Moreover, execution of the operating system may result in a selection of one of the plurality of image files to be provided on the display device.

Figure 11:
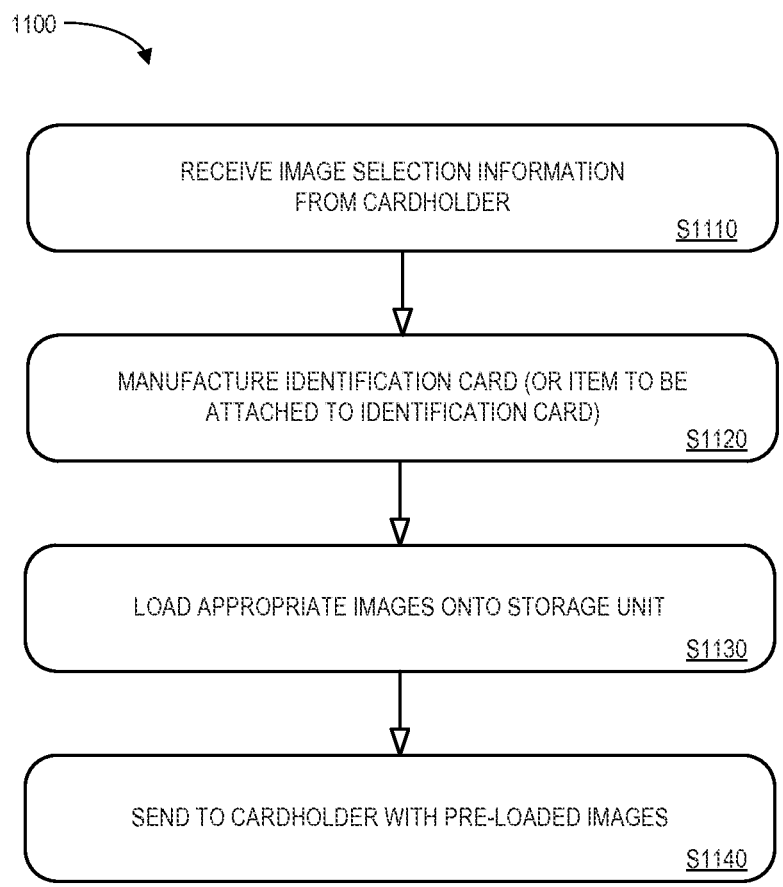
FIG. 11 is an identification card customization method according to some embodiments.

FIG. 11 is an identification card customization method 1100 according to some embodiments. At S1110, image selection information is received from a cardholder, wherein the image selection information is associated with a plurality of image files. According to some embodiments, the image selection information is received from the cardholder via a communication network. Consider, for example, FIG. 12 which illustrates a smartphone with an identification card customization display 1200 in accordance with some embodiments. In this case, a cardholder might select one or more images 1210 to be associated with his or her credit card. The cardholder might also select additional image information 1220 to be displayed on his or her credit card (e.g., reward point and/or available credit values). The image selection information might include, for example, a cardholder image file (e.g., a photograph he or she has taken of a pet) and/or a selection of at least one of a plurality of potential images (e.g., from a library of images stored at a remote server). The image selection information may also include an image rule defined by the cardholder (e.g., indicating that he or she would like to see a particular image on a particular holiday) and/or a selection of at least one of a plurality of potential image rules (e.g., from a library of rules, themes, and/or templates stored at a remote server).

Referring again to FIG. 11, the identification card (or sticker to be attached to the identification card) may be created such that the storage unit stores the plurality of image files at S1120 and S1130. To facilitate the production of identification cards, certain steps may be performed in connection with any of the embodiments described herein. Note that the description of these steps does not necessarily imply a fixed order to the actions, and embodiments may be performed in any order that is practicable. Further note that any of the methods described herein may be performed by hardware, software (microcode), or any combination of these approaches. For example, a storage medium may store thereon instructions that when executed by a machine result in performance according to any of the embodiments described herein. Note that a card body may be formed for an identification card. The card body may be formed, for example, of plastic, metal, glass, or any other suitable substance. After the card or sticker is loaded with image files in accordance with the cardholder's instructions, it may be mailed or otherwise sent to the cardholder at S1140.

Figure 13:
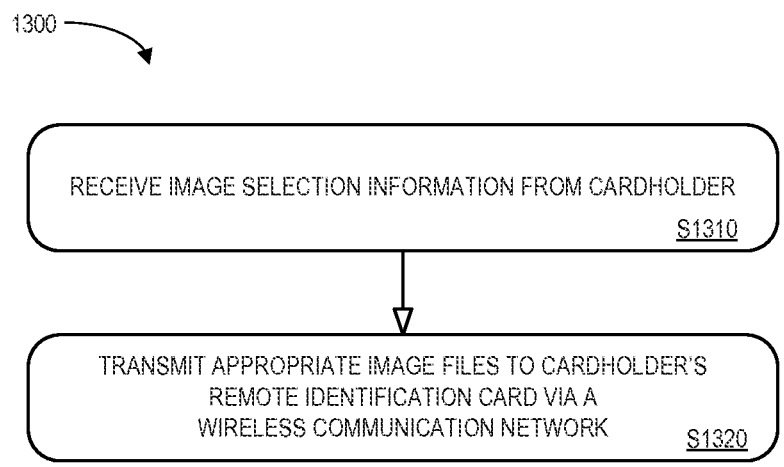
FIG. 13 is an identification card customization method according to another embodiment.
Figure 14:
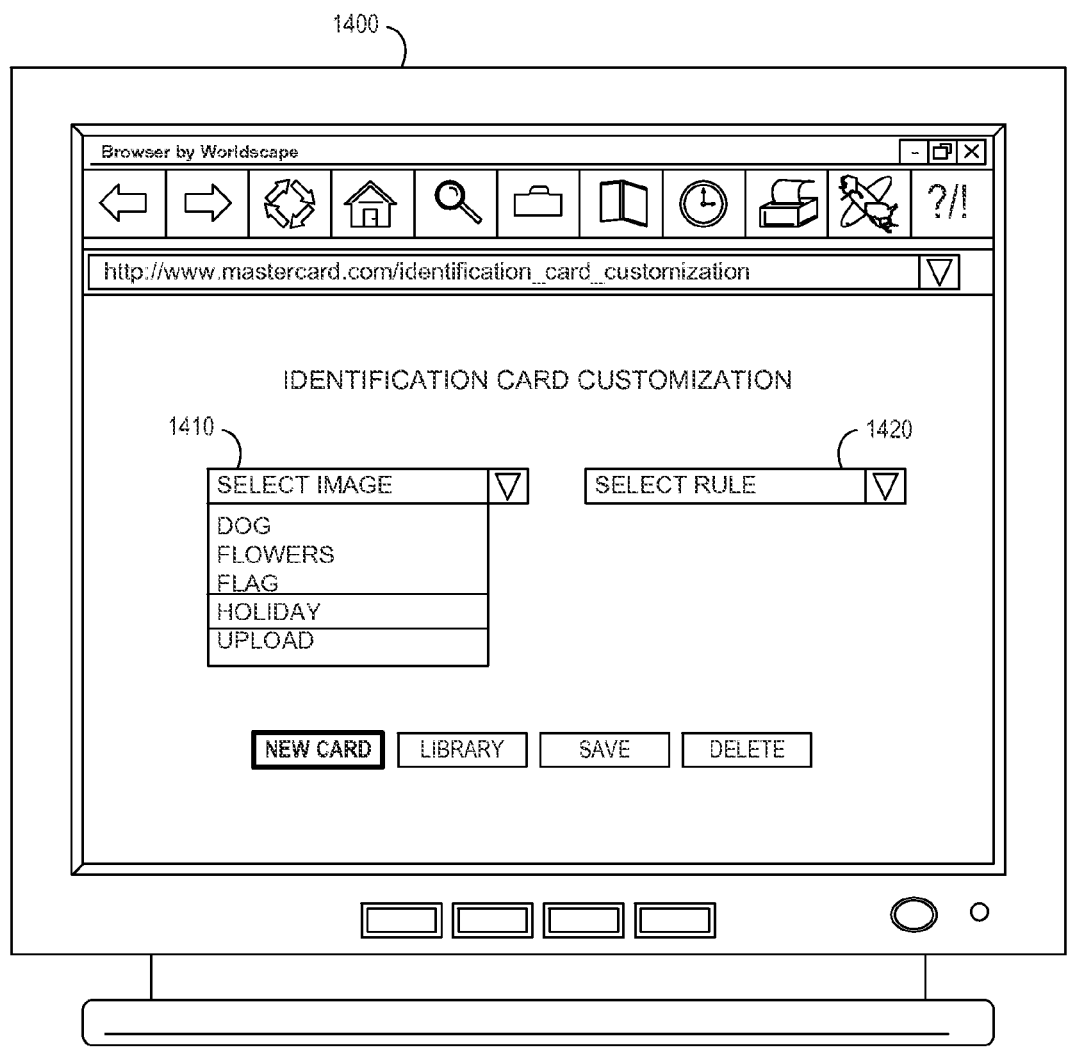
FIG. 14 illustrates an Internet web page identification card customization display in accordance with some embodiments.

Note that embodiments may not need to send a card with pre-loaded images to a cardholder. For example, FIG. 13 is an identification card customization method 1300 according to another embodiment. In this example, image selection information may be received from a cardholder. FIG. 14 illustrates an Internet web page identification card customization display 1400 in accordance with some embodiments that may be used by a cardholder. The cardholder may use the display 1400, for example, to select and/or upload images via area 1410. The cardholder may likewise use the display 1400 to define logic or rules that control when various images should be displayed via a second area 1420. According to some embodiments, a cardholder may select a rule from a predetermined library of potential rules. According to other embodiments, a cardholder might define a customer rule (e.g., such that a special picture is displayed on his or her birthday). Any of the Graphical User Interfaces ("GUIs") described herein may be, for example, associated with a Personal Computers (PC), laptop computer, a smartphone, an enterprise server, a server farm, and/or a database or similar storage units. As used herein, devices, including those associated with identification cards, servers, and GUIs may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks. Once the image selection information is received from a cardholder, the appropriate image files may be transmitted to his or her identification card at 1320. According to some embodiments, some or all of the steps described herein may be associated with an "automated" process. As used herein, the term "automated" may refer to, for example, actions that can be performed with little or no human intervention.

Figure 12:
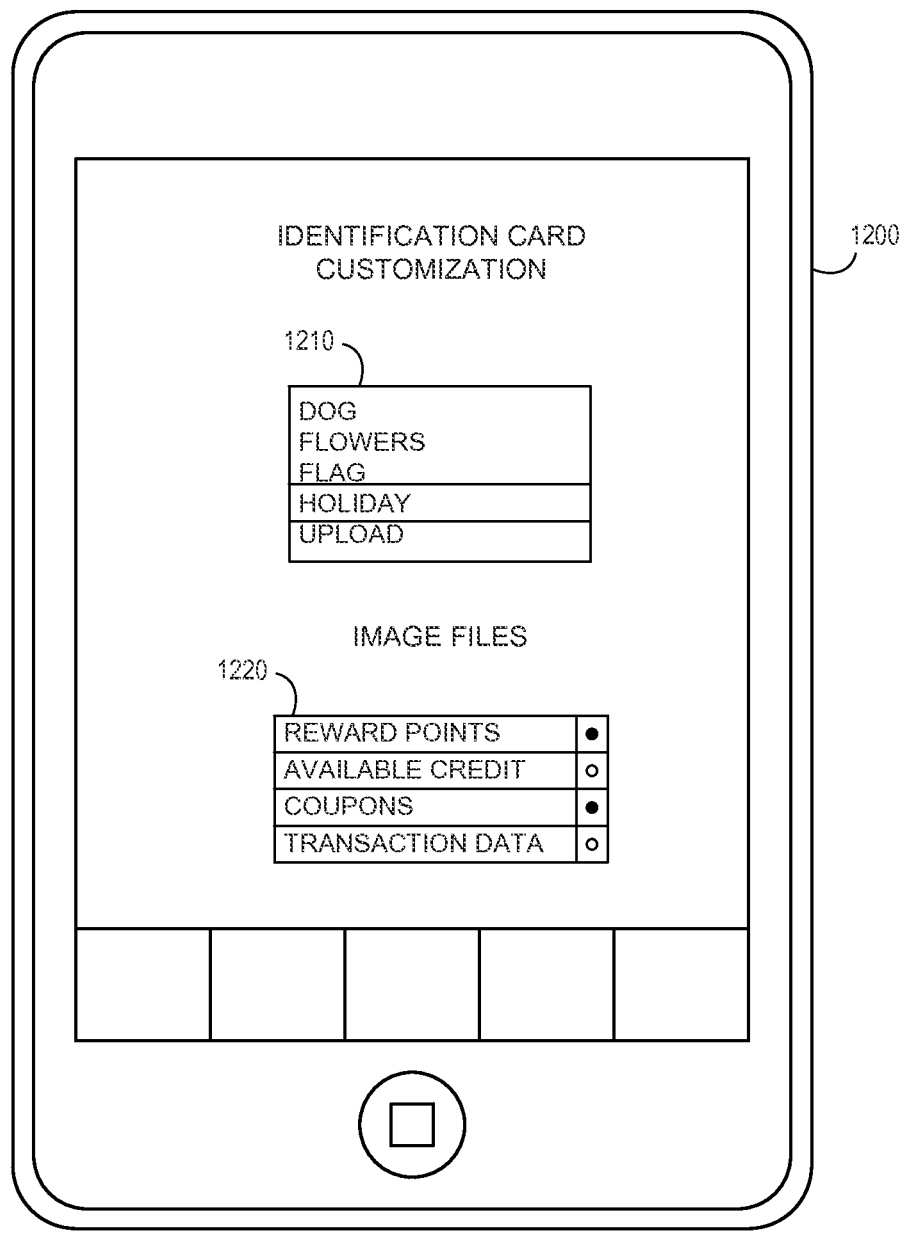
FIG. 12 illustrates a smartphone with an identification card customization display in accordance with some embodiments.
Figure 15:
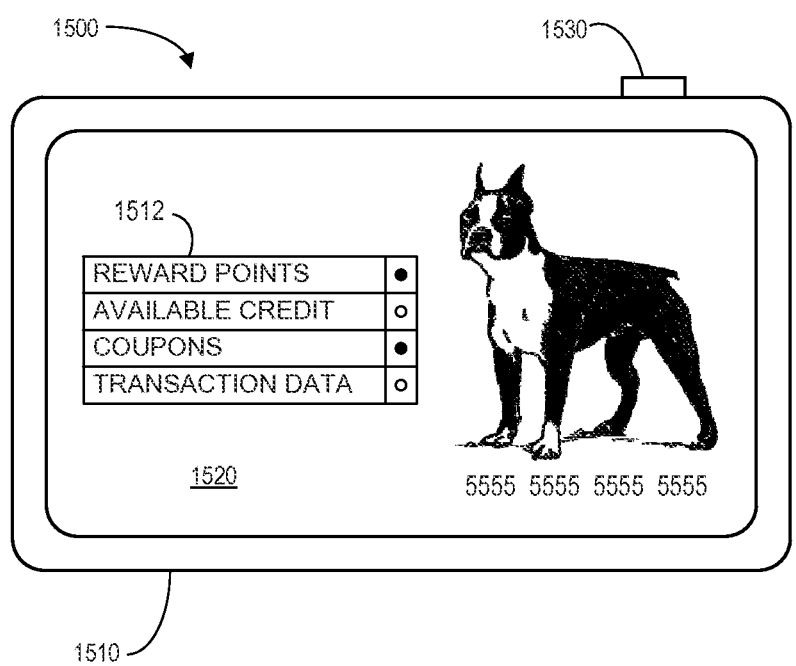
FIG. 15 illustrates a customization display provided on an identification card in accordance with some embodiments.

The examples of FIGS. 12 and 14 might be associated with a smartphone and PC, respectively. Note, however, that any of the embodiments described herein might use the transaction card itself to input image preferences and related information. For example, FIG. 15 illustrates a customization display 1520 provided on an identification card 1500 itself in accordance with some embodiments. In this case, a cardholder might use an input device 1530 and/or touchscreen of the display device 1520 to select images 1512 to be scrolled on a periodic bases (e.g., a new picture might be display every 30 seconds).

Thus, embodiments described herein may let a cardholder customize an identification card with multiple images. Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A computer-implemented method, comprising:
    transmitting, from an identification card customization device to a remote cardholder customization interface device, a plurality of potential image selection rules;
    receiving, at the identification card customization device from the remote cardholder customization interface device, a first image selection, associated with a first image file, along with an indication of a first potential image selection rule;
    receiving, at the identification card customization device from the remote cardholder customization interface device, a second image selection, associated with a second image file, along with an indication of a second potential image selection rule, the second potential image selection rule being different than the first potential image selection rule; and
    arranging for the first and second image files to be stored, along with information about the first and second potential image selection rules, in an identification card storage unit coupled to a substantially card-shaped body of an identification card having: (i) a processor executing an operating system, and (ii) a substantially planar display device to provide visual information to a cardholder, wherein execution of the operating system results in selection of one of the first or second image files to be provided on the display device in accordance with one of the first or second potential image selection rules.

2. The method of claim 1, wherein said receiving includes:
    exchanging information with the cardholder customization interface device via an Internet communication network.

3. The method of claim 2, wherein at least one of the first and second image files includes at least one of: (i) a cardholder image file, and (ii) a selection of at least one of a plurality of potential image files.

4. The method of claim 2, wherein said arranging includes:
    transmitting the first and second image files to the identification card via a wireless communication network different than the Internet communication network.

5. The method of claim 1, wherein the identification card is associated with at least one of: (i) a payment card, (ii) a credit card, (iii) a debit card, (iv) a loyalty program card, (v) a badge, (vi) a license, (vii) a passport card, (viii) a radio frequency apparatus, or (ix) a contactless card.

6. The method of claim 1, wherein at least one of the first and second potential image selection rules is based at least in part on at least one of: (i) a season of year, (ii) a day of year, (iii) a day of week, and (iv) a time of day.

7. The method of claim 6, wherein at least one of the first and second potential image selection rules is further based at least in part on location information.

8. The method of claim 1, further comprising:
    receiving, at the identification card customization device from the remote cardholder customization interface device, a cardholder selection indicating that at least one of the following should be displayed on the identification card: (i) a rewards program point value, (ii) an amount of available credit, (iii) transaction information, (iv) location information, (v) a security token, (vi) advertising information, (vii) coupon information, (viii) warranty information, (ix) insurance information, and (x) a commercial offer.

9. The method of claim 1, wherein at least one of the first and second potential image selection rules is based at least in part on information received via an input device coupled to the substantially card-shaped body and in communication with the processor.

10. The method of claim 9, wherein the input device comprises at least one of: (i) a touch screen incorporated into the display device, (ii) a switch, (iii) a microphone, and (iv) a wireless communication device.

11. A non-transitory, computer readable medium having stored therein instructions that, upon execution, cause a computer to perform a method, the method comprising:
  transmitting, from an identification card customization device to a remote cardholder customization interface device, a plurality of potential image selection rules;
  receiving, at the identification card customization device from the remote cardholder customization interface device, a first image selection, associated with a first image file, along with an indication of a first potential image selection rule;
  receiving, at the identification card customization device from the remote cardholder customization interface device, a second image selection, associated with a second image file, along with an indication of a second potential image selection rule, the second potential image selection rule being different than the first potential image selection rule; and
  arranging for the first and second image files to be stored, along with information about the first and second potential image selection rules, in an identification card storage unit coupled to a substantially card-shaped body of an identification card having: (i) a processor executing an operating system, and (ii) a substantially planar display device to provide visual information to a cardholder, wherein execution of the operating system results in selection of one of first or second image files to be provided on the display device in accordance with one of the first or second potential image selection rules.

12. The medium of claim 11, wherein said receiving includes:
  exchanging information with the cardholder customization interface device via an Internet communication network.

13. The medium of claim 12, wherein at least one of the first and second image files includes at least one of: (i) a cardholder image file, and (ii) a selection of at least one of a plurality of potential images image files.

14. The medium of claim 12, wherein said arranging includes:
  transmitting the first and second image files to the identification card via a wireless communication network different than the Internet communication network.

15. The medium of claim 11, wherein the identification card is associated with at least one of: (i) a payment card, (ii) a credit card, (iii) a debit card, (iv) a loyalty program card, (v) a badge, (vi) a license, (vii) a passport card, (viii) a radio frequency apparatus, or (ix) a contactless card.

16. The medium of claim 11, wherein at least one of the first and second potential image selection rules is based at least in part on at least one of: (i) a season of year, (ii) a day of year, (iii) a day of week, and (iv) a time of day.

17. The medium of claim 16, wherein at least one of the first and second potential image selection rules is further based at least in part on location information.

18. The medium of claim 11, wherein the method further comprises:
  receiving, at the identification card customization device from the remote cardholder customization interface device, a cardholder selection indicating that at least one of the following should be displayed on the identification card: (i) a rewards program point value, (ii) an amount of available credit, (iii) transaction information, (iv) location information, (v) a security token, (vi) advertising information, (vii) coupon information, (viii) warranty information, (ix) insurance information, and (x) a commercial offer.

19. The medium of claim 11, wherein at least one of the first and second potential image selection rules is based at least in part on information received via an input device coupled to the substantially card-shaped body and in communication with the processor.

20. The medium of claim 19, wherein the input device comprises at least one of: (i) a touch screen incorporated into the display device, (ii) a switch, (iii) a microphone, and (iv) a wireless communication device.

* * * * *